US012573750B2

(12) United States Patent
Park et al.

(10) Patent No.: US 12,573,750 B2
(45) Date of Patent: Mar. 10, 2026

(54) HOLOGRAPHIC ANTENNA MODULE

(71) Applicant: LG ELECTRONICS INC., Seoul (KR)

(72) Inventors: Byeongyong Park, Seoul (KR); Ilnam Cho, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 130 days.

(21) Appl. No.: 18/651,171

(22) Filed: Apr. 30, 2024

(65) Prior Publication Data

US 2025/0055185 A1 Feb. 13, 2025

(30) Foreign Application Priority Data

Aug. 11, 2023 (KR) .................. KR10-2023-0105639

(51) Int. Cl.

| | |
|---|---|
| ***H01Q 3/24*** | (2006.01) |
| ***H01Q 1/48*** | (2006.01) |
| ***H01Q 23/00*** | (2006.01) |

(52) U.S. Cl.

CPC ................ *H01Q 3/24* (2013.01); *H01Q 1/48* (2013.01); *H01Q 23/00* (2013.01)

(58) Field of Classification Search

CPC .... H01Q 1/243; H01Q 21/065; H01Q 9/0414; H01Q 1/2283; H01Q 1/38; H01Q 21/28; H01Q 9/045; H01Q 21/08; H01Q 1/48; H01Q 21/24; H01Q 9/0457; H01Q 9/0407; H01Q 1/24

See application file for complete search history.

(56) References Cited

U.S. PATENT DOCUMENTS

2020/0021041 A1* 1/2020 Artemenko ........... H01P 1/2138
2025/0055185 A1* 2/2025 Park ......................... H01Q 1/48

* cited by examiner

*Primary Examiner* — Wei (Victor) Y Chan

(74) *Attorney, Agent, or Firm* — LEE, HONG, DEGERMAN, KANG & WAIMEY

(57) ABSTRACT

Proposed is an antenna module including a waveguide configured to have an opening area in such a manner that a signal in a specific frequency band is transferred, the waveguide including a first ground formed on a first layer and a second ground formed on a second layer over the first layer, a slot formed in a first axial direction in the second ground, a PCB arranged on top of the second ground, a metal patch formed on a front surface of the PCB and overlapping the slot, and a switching element configured to connect between a second point on a first metal patch and a third point on a second metal patch.

15 Claims, 15 Drawing Sheets

(a) (b)

(a)

(b)

(a)

(b)

(c)

(a)

(b)

HOLOGRAPHIC ANTENNA MODULE

CROSS-REFERENCE TO RELATED APPLICATION(S)

Pursuant to 35 U.S.C. § 119 (a), this application claims the benefit of earlier filing date and right of priority to Korean Patent Application No. 10-2023-0105639, filed on Aug. 11, 2023, the contents of which are all hereby incorporated by reference herein in their entireties.

TECHNICAL FIELD

The present disclosure relates to a holographic antenna module. Particularly, the present disclosure relates to a holographic antenna module capable of radiating or blocking a signal on a per-operating frequency band basis.

BACKGROUND

Phase array antennas are capable of adjusting a beam steering direction by electrically controlling a phase of a radio wave on a per-element basis. The control of the phase of the radio wave on a per-element basis applies to a phase shift of a radio frequency terminal. A problem with this phase shifter is that it increases the weight, size, cost, and the like of the phase array antenna.

In recent years, research has been actively conducted on a reconfigurable intelligent surface (RIS), such as a metasurface, which adjusts the direction of a radio wave using a change in permittivity of liquid crystal. A problem with a liquid crystal-based return metasurface that interacts with a radio wave is that it has low performance in radio wave efficiency due to a high return loss of liquid crystal, which is its primary material.

In addition, when the RIS is realized, the technique involving the variation of permittivity by rotating a polymer material is applied to a liquid crystal layer. Therefore, a problem arises in that an increase in the change in the permittivity of the liquid crystal layer leads to a longer switching time for changing a phase value, making it difficult to use the liquid crystal-based return metasurface in dynamic communication systems, such as 6G wireless communication.

Therefore, there is a need for research on an antenna module employing an RIS structure capable of adjusting the direction of a radio wave while reducing the switching time in 6G wireless communication systems.

SUMMARY

One object of the present disclosure is to provide a holographic antenna module capable of radiating or blocking a signal on a per-operating frequency band basis.

Another object of the present disclosure is to provide an antenna module including a metasurface capable of adjusting the direction of a radio wave while reducing the switching time in 6G wireless communication systems.

Still another object of the present disclosure is to transmit or receive a wireless beamforming signal in a desired direction over a broadband by arranging a plurality of holographic antenna switches and thus forming an array structure.

Still another object of the present disclosure is to provide an antenna module capable of performing beamforming through a metasurface without a separate phase variable element.

Still another object of the present disclosure is to provide an antenna module capable of performing beamforming through a metasurface without electronic components that are high-priced and high-power consuming.

In order to achieve these and other advantages and in accordance with the purpose of this specification, as embodied and broadly described herein, there is provided an antenna module including: a waveguide configured to have an opening area in such a manner that a signal in a specific frequency band is transferred, the waveguide including a first ground formed on a first layer and a second ground formed on a second layer over the first layer; a slot formed in a first axial direction in the second ground; a PCB arranged on top of the second ground; a metal patch formed on a front surface of the PCB and overlapping the slot; and a switching element configured to connect between a second point on the first metal patch and a third point on the second metal patch.

In the antenna module, the metal patch includes a first metal patch and a second metal patch arranged to be spaced apart in a first axial direction from the first metal patch. The antenna module may further a via configured to connect a first point on any one of the first metal patch and the second metal patch and the second ground to each other.

In the antenna module, when the switching element is in a switched-off state, the slot may radiate a first signal in a first frequency band. In the antenna module, when the switching element is in a switched-on state, the metal patch may radiate a second signal in a second frequency band broader than the first frequency band.

The technical effects of this holographic antenna module are described as follows.

According to an embodiment of the present disclosure, a signal may be radiated or blocked on a per-operating frequency band through the switching-on or off of the switching element of the holographic antenna module.

According to the embodiment of the present disclosure, the direction of a radio wave can be adjusted while reducing the switching time in 6G wireless communication systems through the antenna module including the metasurface.

According to the embodiment of the present disclosure, a wireless beamforming signal can be transmitted or received in a desired direction over a broad band by arranging a plurality of holographic antenna elements and thus forming an array structure.

According to the embodiment of the present disclosure, without a separate phase variable element, beamforming can be performed through the metasurface including the metal patches and the switching element.

According to the embodiment, without separate electronic components, such as a phase shifter and a beamforming module, that are high-priced and high-power consuming, beamforming can be performed through the metasurface including only the metal patches and the switching element.

Further scope of applicability of the present disclosure will become apparent from the following detailed description. It should be understood, however, that the detailed description and specific examples, such as the preferred embodiments of the present disclosure, are given by way of illustration only, since various modifications and alternations within the concept and scope of the disclosure will be apparent to those skilled in the art.

DETAILED DESCRIPTION OF THE EMBODIMENTS

A description will now be given in detail of specific embodiments of the present disclosure, together with drawings.

In general, a suffix such as "module" and "unit" may be used to refer to elements or components. Use of such a suffix herein is merely intended to facilitate description of the specification, and the suffix itself is not intended to give any special meaning or function.

A module, including a plurality of elements that are capable of operating as a radiator according to the present disclosure, will be described below.

Regarding this matter, the module, including the plurality of elements according to the present disclosure, may be referred to as a holographic antenna module.

The holographic antenna module may be configured to support 6G wireless communication services. Regarding this matter, the holographic antenna module may be configured to operate in a millimeter wave band or a 10 GHz band. The holographic antenna module may find application in mobile communication antennas, vehicular antennas, or satellite communication antennas.

The 6G wireless communication service may not find application only in electronic devices, such as mobile terminals or image display devices. The 6G wireless communication service may find application in fully autonomous vehicles, artificial intelligence (AI) robots, and electronic devices supporting augmented/virtual reality (AR/VR)-based metaverses.

Figure 1:
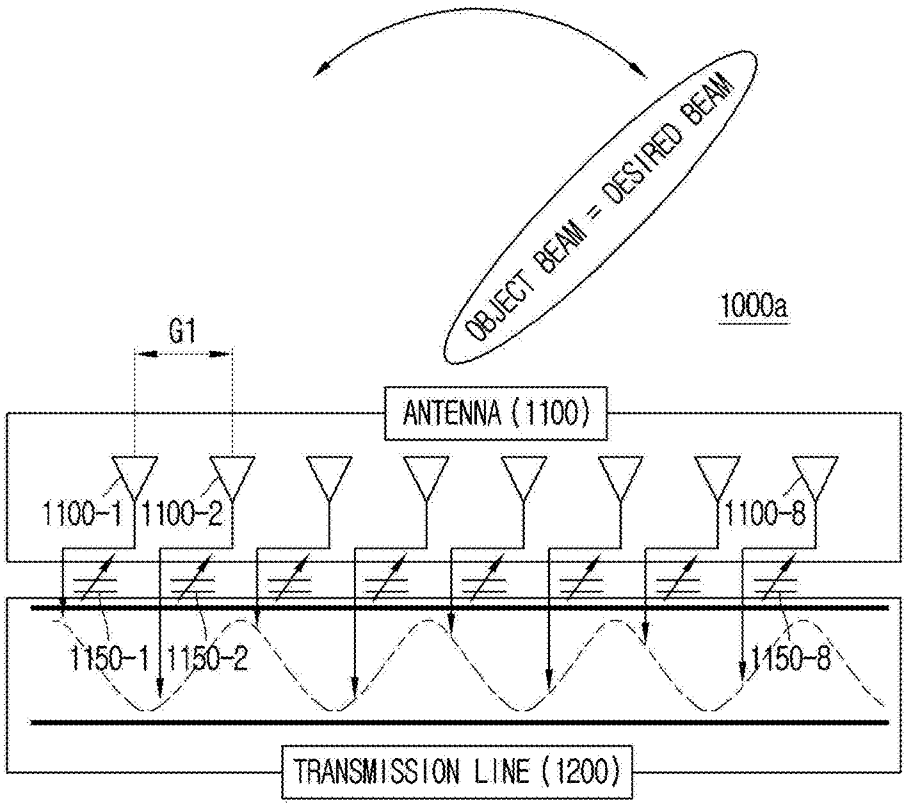
FIG. 1 is a view illustrating that a module including a plurality of elements according to the present disclosure employs a structure of a holographic antenna module.

FIG. 1 is a view illustrating that a module including a plurality of elements according to the present disclosure employs a structure of a holographic antenna module. With reference to FIG. 1, a holographic antenna module 1000 may be configured as an array antenna including a plurality of elements, that is, elements 1100-1 to 1100-8. The number of elements is not limited to 8, but may vary depending on applications.

The antenna module 1000 may be configured as a one-dimensional array antenna in which a plurality of elements are arranged in one axial direction. As another example, the antenna module 1000 may be configured as a two-dimensional array antenna in which a plurality of elements are in one axial direction and the other axial direction perpendicular to the one axial direction.

A distance G1 between each of the plurality of elements, that is, the elements 1100-1 to 1100-8 may be set to fall within a predetermined range, using as a reference one-fourth of a wavelength corresponding to an operating frequency. The plurality of elements, that is, the elements 1100-1 to 1100-8 may be operatively connected to switching elements 1150-1 to 1150-8, respectively. The switching elements 1150-1 to 1150-8 may be realized as pin diodes, varactor diodes, or variable reactance elements.

A transmission line 1200, connected to the plurality of elements, that is, the elements 1100-1 to 1100-8, may be realized as a waveguide, a micro-strip line, a strip line, or a substrate integrated waveguide (SIW). The plurality of elements, that is, the elements 1100-1 to 1100-8 may be controlled in such a manner as to be switched on or off independently of each other. To adjust a beamforming direction of the antenna module 1000, the plurality of elements, that is, the elements 1100-1 to 1100-8 may be controlled in such a manner as to be switched on or off independently of each other.

Since the plurality of elements, that is, the elements 1100-1 to 1100-8 are switched on or off independently of each other, a signal applied to each of the plurality of elements, that is, the elements 1100-1 to 1100-8 may vary in phase, as illustrated in the transmission line 1200 in FIG. 1.

Figure 2:
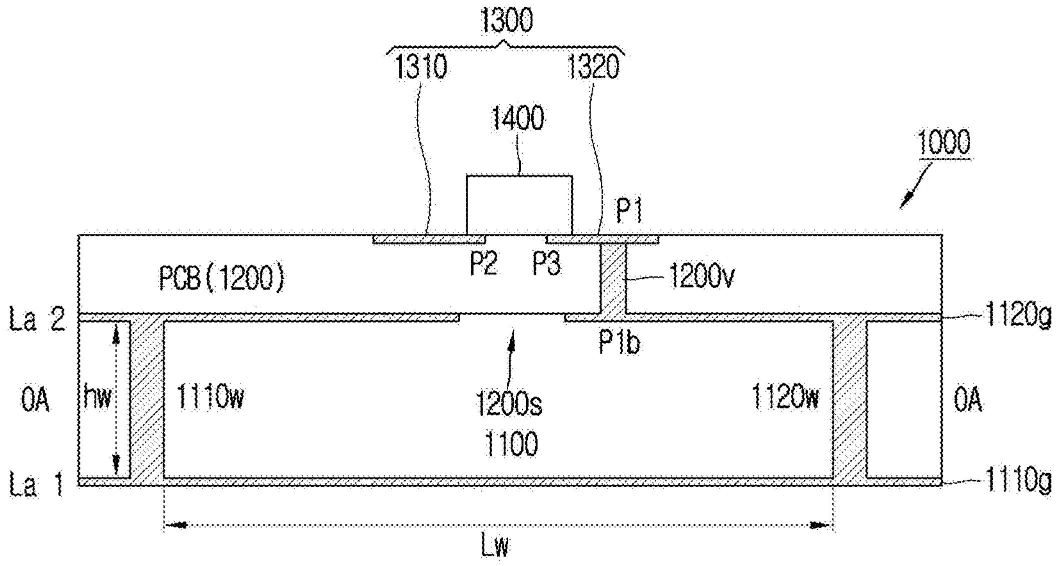
FIG. 2 is a cross-sectional view illustrating an antenna module according to the present disclosure.
Figure 3A:
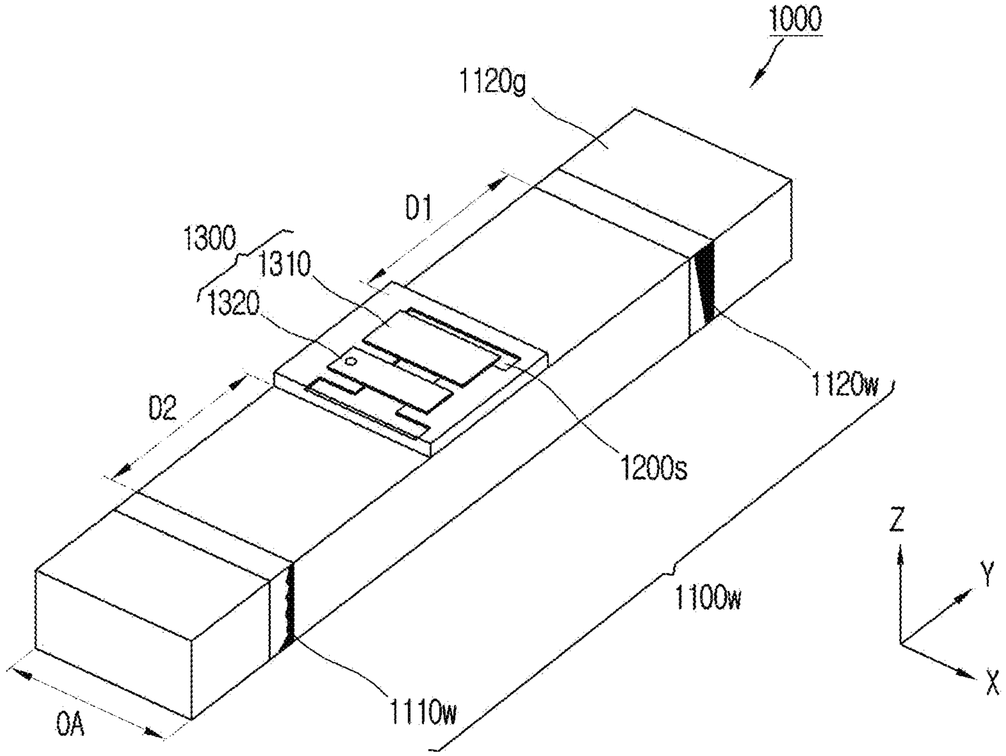
FIGS. 3A and 3B are a perspective view and a front view, respectively, that illustrate the antenna module in FIG. 2.
Figure 3B:
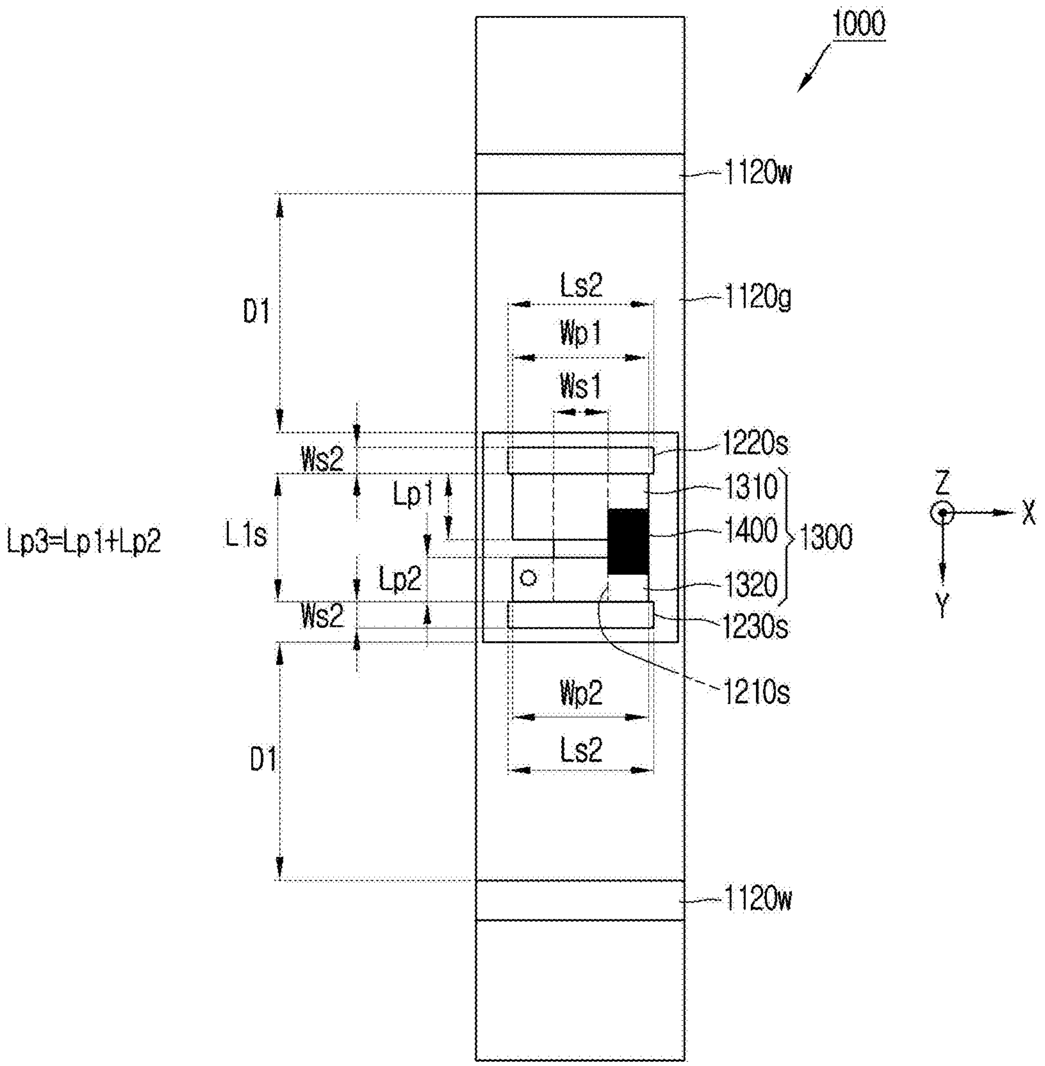

The antenna module 1000 that performs 6G wireless communication according to the present disclosure will be described below. The antenna module 1000 according to the present disclosure may be configured with a metasurface module that radiates a wireless signal in a specific frequency band. Specifically, FIG. 2 is a cross-sectional view illustrating the antenna module 1000 according to the present disclosure. FIGS. 3A and 3B are a perspective view and a front view, respectively, that illustrate the antenna module 1000 in FIG. 2.

With reference to FIGS. 2 to 3B, the antenna module 1000 according to the present disclosure is described. The antenna module 1000 may be configured to include a waveguide 1100, a PCB 1200, a metal patch 1300, and a switching element 1400. The antenna module 1000 may be configured to further include a slot **1200*s* and a via 1200*v***.

The waveguide 1100 may be configured to have an opening area OA in such a manner that a signal in a specific frequency band is transferred. The waveguide 1100 may be formed to have a predetermined length Lw in the Y-axis direction, which is the lengthwise direction. The waveguide 1100 may be formed to have a predetermined height hw in the Z-axis direction, which is the height direction.

The waveguide 1100 may include a first ground 1110*g* formed on a first layer La1, and a second ground 1120*g* formed on a second layer La2 over the first ground 1110*g* in the height direction of the first layer La1. The second ground 1120*g* may be set to be positioned over the first layer La1 in the Z-axis direction, which is the height direction. The opening area OA is formed in a space between the first ground 1110*g* and the second ground 1120*g*. A first metal wall 1110*w* may be vertically formed in such a manner as to connect the first ground 1110*g* and the second ground 1120*g* to each other. A second metal wall 1120*w* may be vertically formed in such a manner as to connect the first ground 1110*g* and the second ground 1120*g* to each other. An RF signal may be transmitted through a space between the first metal wall 1110*w* and the second metal wall 1120*w*. A slot 1200*s* may be formed in the second ground 1120*g*, and thus, a signal in a specific frequency band may be transferred to the metal patch 1300.

The PCB 1200 may be arranged on top of the second ground 1120*g* in the height direction of the second ground 1120*g*. The metal patch 1300 may be formed on a front surface of the PCB 1200. The metal patch 1300 may be arranged at the center point of the waveguide 1100 in the Y-axis direction, but is not limited to this center point. The metal patch 1300 may also be arranged to be offset a predetermined distance in the Y-axis direction from the center point of the waveguide 1100.

The metal patch 1300 may include a first metal patch 1310 and a second metal patch 1320. The second metal patch 1320 may be arranged to be spaced apart in a first axial direction from the first metal patch 1310. The first axial direction may correspond to the X-axis direction.

The metal patch 1300 may be arranged in a manner that overlaps the slot 1200*s*. The via 1200*v* may be configured in such a manner to connect a first point P1 on any one of the first and second metal patches 1310 and 1320 and the second ground 1120*g* to each other. The first point P1 may be formed in a one-side area in a second axial direction, which is perpendicular to the first axial direction, in relation to the center point of the slot 1200*s*. The first axial direction and the second axial direction may correspond to the X-axis direction and the Y-axis direction, respectively. An electromagnetic wave within the waveguide 1100 may be transferred in the second axial direction, which is the Y-axis direction.

The via 1200*v* may be formed in such a manner as to vertically connect the first point P1, which is offset in the second axial direction from the center point of the slot 1200*s* on the XY plane and a first point P1*b* on the second ground 1120*g* to each other.

The switching element 1400 may be configured to connect between a second point P2 on the first metal patch 1310 and a third point P3 on the second metal patch 1320. The switching element 1400 may be realized as an element such as a pin diode, but is not limited thereto. The switching elements 1400 may be realized as an arbitrary variable element, depending on applications. Operational characteristics of each antenna element, which are an operating frequency, a gain, an amount of radiation, and the like may be adjusted by switching on or off a variable element, such as the switching element 1400.

The switching element 1400 may operate in a switched-on state in a manner that enables a path between the second point P2 and the third point P3 or may operate in a switched-off state in a manner that disables the path therebetween. The second point P2 and the third point P3 may be formed in the other-side area in the second axial direction, which is the Y-axis direction, in relation to the center point of the slot 1200*s*. Therefore, along the Y axis in relation to the center point of the slot 1200*s* on the XY plane, the via 1200*v* may be arranged in the one-side area, and the switching element 1400 may be arranged in the other side area. The via 1200*v* and the switching element 1400 may be arranged in different areas, respectively, along the Y-axis in relation to the center point of the slot 1200*s*. Since the via 1200*v* and the switching element 1400 are arranged in the one side area and the other-side area, respectively, an electric current path in the shape of the letter U may be formed.

The second point P2 may be formed in an upper area in the first axial direction, which is the X-axis direction. The second point P2 may be formed in the other-side upper area in the first axial direction and the second axial direction. The third point P3 may be formed in a lower area in the first axial direction. The third point P3 may be formed in the other-side lower area in the first axial direction and the second axial direction.

Figure 4:
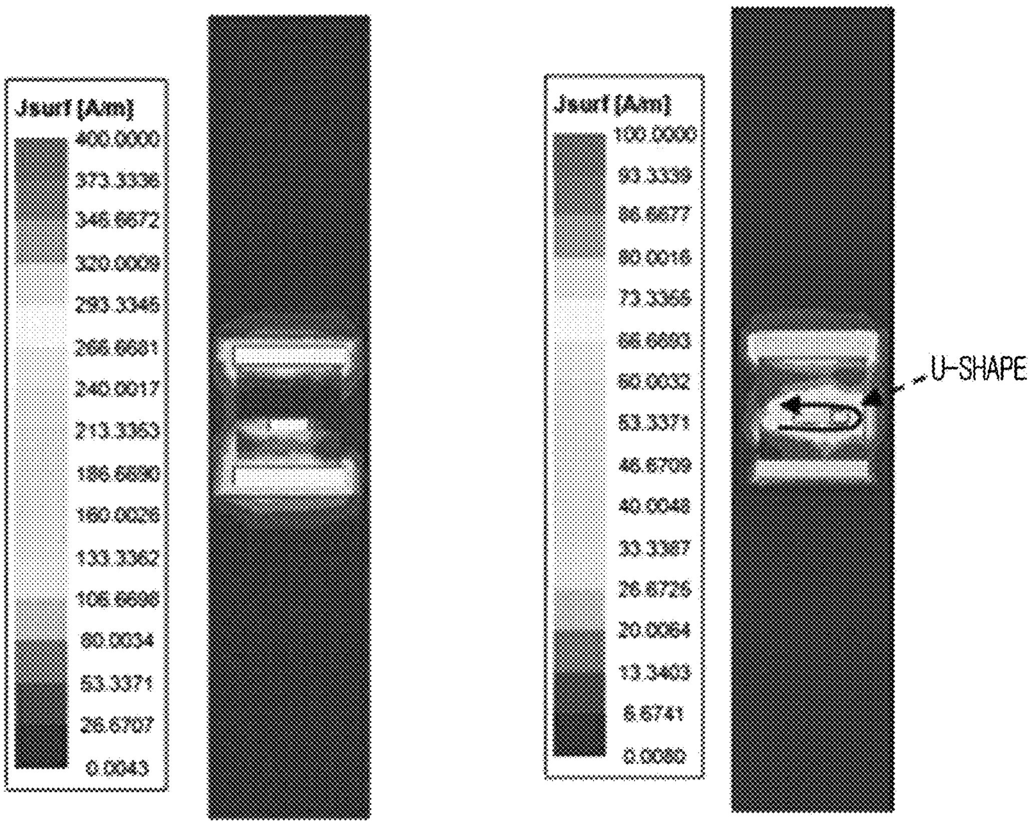
FIG. 4 illustrates a distribution of electric current that, according to switching-on or off of a switching element, is formed in a second ground in which a slot is formed.

Regarding the electric current path in the shape of the letter U, FIG. 4 illustrates a distribution of electric current that, according to the switching-on or off of the switching element 1400, is formed in the second ground 1120*g* in which the slot 1100*s* is formed. With reference to FIGS. 3B and 4A, when the switching element 1400 is switched off, a higher distribution of electric current is formed in the H-shaped slot 1200*s* in the second ground 1120*g* than in other areas. The antenna module 1000 operates in a slot coupling mode by the first metal patch 1310 rather than the second metal patch 1320. Therefore, the antenna module 1000 is configured in such a manner as to resonate in the first frequency band, which is a narrow frequency band, when the switching element 1400 is switched off.

With reference to FIGS. 3B and 4B, when the switching element 1400 is switched on, the first metal patch 1310 and the second metal patch 1320 are electrically connected to each other. Accordingly, a slit is formed between the first metal patch 1310 and the second metal patch 1320, and the electric current path in the shape of the letter U is formed. When the switching element 1400 is switched on, the antenna module 1000 operates in a slit radiation mode. Therefore, the antenna module 1000 is configured in such a manner as to resonate in a second frequency band, which is a broad frequency band, when the switching element 1400 is switched on.

A higher distribution of electric current is formed in the H-shaped slot 1200*s* in the second ground 1120*g* than in other areas. The antenna module 1000 operates in the slot coupling mode by the first metal patch 1310 rather than the second metal patch 1320. Therefore, the antenna module 1000 is configured in such a manner as to resonate in the first frequency band, which is a narrow frequency band, when the switching element 1400 is switched off.

The slot 1200*s* may be formed in the first axial direction, which is the X-axis direction, and the second axial direction, which is the Y-axis direction. Regarding this matter, the slot 1200*s* may be configured to include a plurality of slot portions.

The slot 1200*s* may be configured to include a first slot portion 1210*s*, a second slot portion 1220*s*, and a third slot portion 1230*s*. The slot 1200*s* including the first to third slot portions 1210*s* to 1230*s* may be formed to be H-shaped and thus may be referred to as a “H-slot.”

The first slot portion 1210*s* may be formed to have a first length Ls1 in the second axial direction perpendicular to the first axial direction, and to have a first width Ws1 in the first axial direction. The second slot portion 1220*s* may be formed to be connected to one end portion of the first slot portion 1210*s*. The third slot portion 1230*s* may be formed to be connected to the other end portion of the first slot portion 1210*s*. The second slot portion 1220*s* may be formed to extend from the one end portion of the first slot portion 1210*s* in such a manner as to have a second length Ls2 in the second axial direction and to have a second width Ws2 in the second axial direction. The third slot portion 1230*s* may be formed to extend from the other end portion of the first slot portion 1210*s* in such a manner as to have the second length Ls2 in the first axial direction and to have the second width Ws2 in the second axial direction.

In the slot 1200*s* formed like a H-slot, the first slot portion 1210*s* in the second axial direction may operate as a main slot, and the second and third slot portions 1220*s* and 1230*s* in the first axial direction may operate as auxiliary slots. Accordingly, the first slot portion 1210*s* may be formed such that the first length Ls1 thereof is greater than the second length Ls2 of each of the second slot portion 1220*s* and the third slot portion 1230*s*. For example, the first slot portion 1210*s* may be formed such that the first length Ls1 thereof falls within a predetermined range, using 3.5 mm as a reference. The second slot portion 1220*s* and the third slot portion 1230*s* may be formed such that the second length Ls2 of each of them falls within a predetermined range, using 2.8 mm as a reference.

The first slot portion 1210*s* may be formed such that the first length Ls1 thereof is greater than a third length Lp3, in the second axial direction, of the metal patch 1300. The third length Lp3 of the metal patch 1300 may be set to the sum of the first length Lp1 of the first metal patch 1310 and the second length Lp2 of the second metal patch 1320. The first metal patch 1310 and the second metal patch 1320 may be formed in such a manner as to be spaced a predetermined distance Ga apart in the second axial direction from each other.

The metal patch 1300 may be formed such that a first width Wp1, in the first axial direction, thereof is equal to or smaller than the second length Ls2 of each of the second slot portion 1220*s* and the third slot portion 1230*s*. The metal patch 1300 may be formed such that the first width Wp1, in the first axial direction, thereof falls within a predetermined range, using as a reference one-fourth of a minimum wavelength corresponding to a maximum operating frequency. The first width Wp1 of the metal patch 1300 may be set to fall within a predetermined range, using as a reference one-fourth of a minimum wavelength, in such a manner that a slit is formed when the switching element 1400 operates in the switched-on state.

The first length Ls1 of the first slot portion 1210*s*, the second length Ls2 of each of the second slot portion 1220*s* and the third slot portion 1230*s*, and the first width Wp1 of the metal patch 1300 may be set to one-fourth or less of a wavelength corresponding to the minimum operating frequency.

The first and second metal patches 1310 and 1320 and the slot 1200*s*, which is formed like a H-slot, may be arranged in such a manner as to be stacked on top of each other in the Z-axis direction, which is the third axial direction, thereby having an overlapping structure. The first metal patch 1310 may be arranged in a manner that overlaps an upper area of the first slot portion 1210*s* formed in the Y-axis direction. The second metal patch 1320 may be arranged in a manner that overlaps a lower area of the first slot portion 1210*s* formed in the Y-axis direction.

The first metal patch 1310 may be arranged such that one end portion thereof aligns with one end portion of the first slot portion 1210*s*. The first metal patch 1310 may be arranged such that the other end portion thereof aligns with one end portion of the second slot portion 1320. The second metal patch 1320 may be arranged such that the other end portion thereof aligns with the other end portion of the first slot portion 1210*s*. Accordingly, an electric current component formed through the first slot portion 1210*s* may be coupled with the first and second metal patches 1310 and 1320. For impedance matching between the slot 1200*s* and the metal patch 1300, the second and third slot portions 1220*s* and 1230*s* may be formed to extend from both end portions, respectively, of the first slot 1210*s*.

Figure 5:
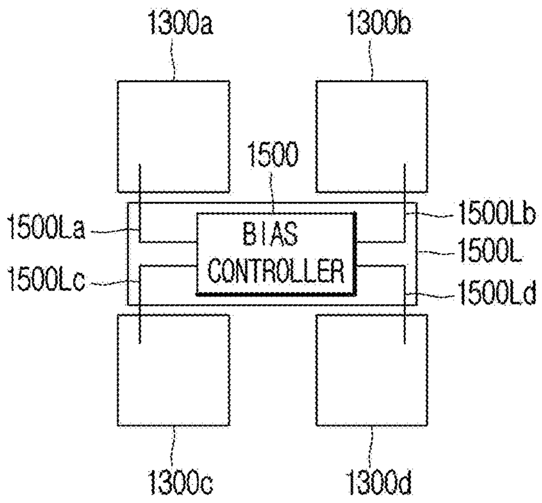
FIG. 5 is a view illustrating a structure where bias lines are connected to antenna elements, respectively, through a bias controller in the antenna module that is formed as an array antenna.
Figure 6A:
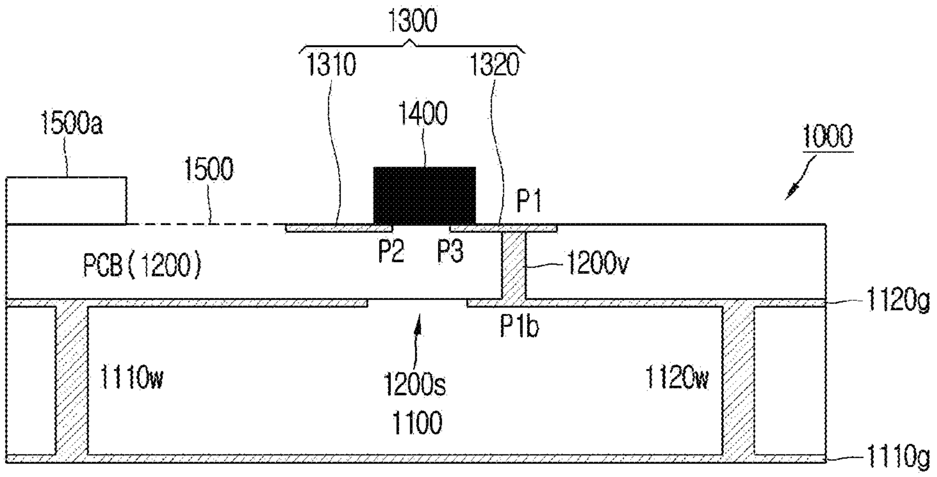
FIGS. 6A to 6C are views illustrating structures, as practical examples, where bias controllers arranged at different positions are connected to the switching element.
Figure 6B:
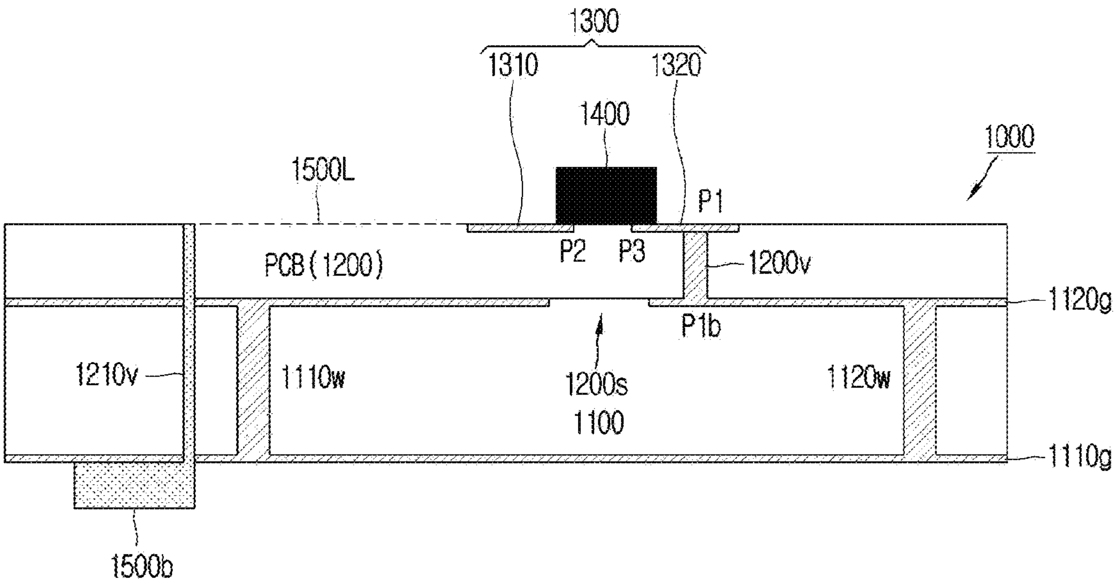
Figure 6C:
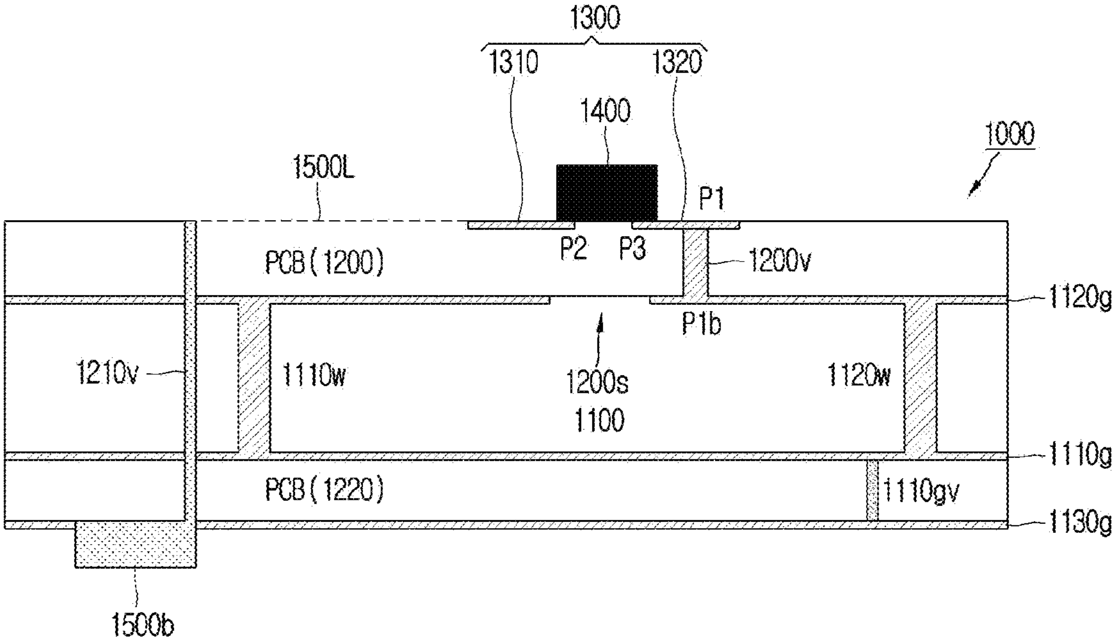

The antenna module 1000, employing a waveguide-slot-metal patch transfer structure, according to the present disclosure may be configured to switch on or off a pin diode, which is a switching element, through a bias controller. Regarding this matter, FIG. 5 is a view illustrating a structure where bias lines 1500La to 1500Ld are connected to antenna elements 1300*a* to 1300*d*, respectively, through a bias controller 500 in the antenna module 1000 that is formed as an array antenna. FIGS. 6A to 6C are views illustrating structures, as practical examples, where bias controllers 1500*a*, 1500*b*, and 1500*c* arranged at different positions are connected to the switching element.

With reference to FIG. 5, the bias controller 1500 may be connected to antenna elements 1300*a* to 1300*d* through the bias lines 1500La to 1500Ld, respectively. Voltages applied to the antenna elements 1300*a* to 1300*d* through the bias lines 1500La to 1500Ld, respectively, may be different from each other. Accordingly, the antenna elements 1300*a* to 1300*d* may operate in different frequency bands, respectively. Each of the antenna elements 1300*a* to 1300*d*, as illustrated in FIGS. 3A to 4B, may be configured to include the first and second metal patches 1310 and 1320 and the switching element 1400 connecting the first and second metal patches 1310 and 1320 to each other.

With reference to FIGS. 5 to 6C, the antenna module 1000 may further include the bias controller 1500, 1500*a*, 1500*b*, or 1500*c*. The bias controller 1500, 1500*a*, 1500*b*, or 1500*c* may control the switching element 1400 in a manner that enters the switched-on or off state, by applying electric power to the switching element 1400. The bias controller 1500, 1500*a*, 1500*b*, or 1500*c* may be connected to any one of the first metal patch 1310 and the second metal patch 1320 through a bias line 1500L.

With reference to FIG. 6A, the bias controller 1500*a* may be arranged on a front surface of the PCB 1200. The bias line 1500L arranged on the front surface of the PCB 1200 may be connected to any one of the first and second metal patches 1310 and 1320.

With reference to FIG. 6B, the bias controller 1500*b* may be arranged on the first layer La1 of the waveguide 1100, the first ground 1110*g* being formed on the first layer La1. The bias controller 1500*b* arranged on the first layer La1 of the waveguide 1100 may be connected to the bias line 1500L arranged on the front surface of the PCB 1200 through a first vertical via 1210*v*.

With reference to FIG. 6C, the antenna module 1000 may further include a second PCB 1220 arranged underneath the second ground 1120*g* of the waveguide 1100. The third ground 1130*g* arranged on a rear surface of the second PCB 1220 may be connected to a ground of the waveguide 1100 through ground vias 1100*gv*. A third ground 1130*g* may be connected to the first ground 1110*g* of the waveguide 1100 through the ground vias 1100*gv*. The bias controller 1500*c* may be arranged on the rear surface of the second PCB 1220. The bias controller 1500*c* arranged on the rear surface of the second PCB 1220 may be connected to the bias line 1500L arranged on the front surface of the PCB 1200 through a second vertical via 1220*v*.

In the antenna module 1000, employing the waveguide-slot-metal patch transfer structure, according to the present disclosure, the bias line may be realized as an RF choke or a stub structure. Accordingly, a DC voltage can be blocked from being applied to the switching element through the bias line, and an RF signal can be blocked from entering the bias line.

Figure 7A:
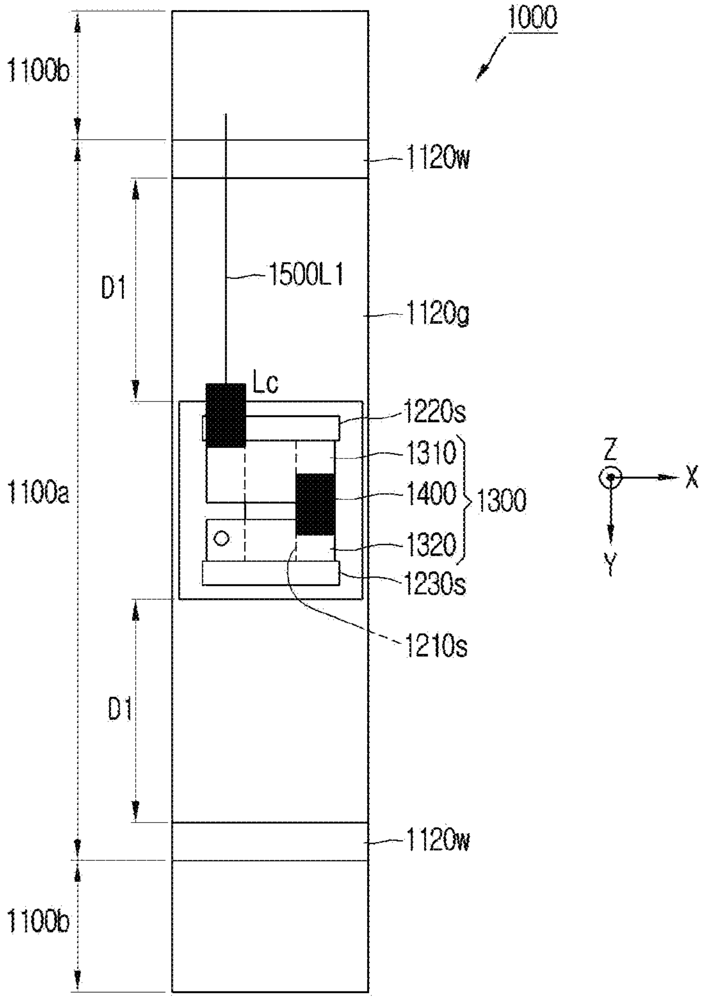
FIGS. 7A and 7B are front views illustrating the antenna modules which employ different DC voltage application structures, as practical examples.
Figure 7B:
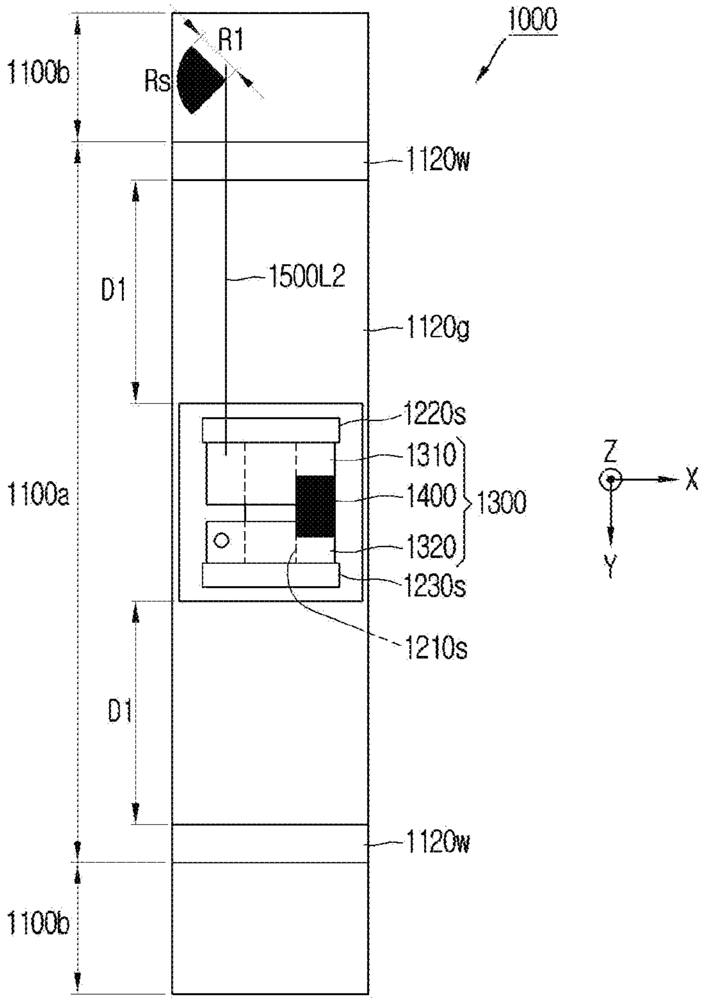

FIGS. 7A and 7B are front views illustrating the antenna modules 1000 which employ different DC voltage application structures, as practical examples. FIG. 7A illustrates a structure in which the bias line is realized through an RF choke. FIG. 7B illustrates a structure in which the bias line is realized through a stub.

With reference to FIGS. 2 to 3B and FIG. 7A, the bias line 1500L1 may be connected to any one of the first and second metal patches 1310 and 1320 through an RF choke Lc configured to block an RF signal in the first and second frequency bands. The bias line 1500L1 may be realized as having a linewidth that is equal to or smaller than a specific width. For example, the bias line 1500L1 may be realized as having a linewidth that is equal to or smaller than 200 μm, and may be connected to the bias controller 1500, 1500*a*, 1500*b*, or 1500*c* as illustrated in FIGS. 5 to 6C, respectively.

With reference to FIGS. 2 to 3B and FIG. 7B, the bias line 1500L2 may be connected to any one of the first and second metal patches 1310 and 1320 through a radial stub Rs configured to block the RF signal in the first and second frequency bands. The radial stub Rs may be formed to have a first radius R1 and a predetermined range of angles and may be configured to block the RF signal.

The radial stub Rs may be formed on a first surface on which the metal patch 1300 is arranged, the first surface being a radiation surface. The radial stub Rs may be formed on a second surface facing the first surface on which the metal patch 1300 is arranged, the first surface being a radiation surface. The formation of the radial stub Rs on the second surface can reduce mutual interference with the metal patch 1300 arranged on the first surface, thereby having less effect on changes in radiation performance. In order to reduce the mutual interference with the metal patch 1300, the radial stub Rs may be arranged on a second area 1100*b*, which is a non-waveguide area, instead of a first area 1100*a*, which is a waveguide area.

Regarding the radial stub Rs formed on the second surface, the bias line 1500L may be arranged on the first surface. The radial stub Rs formed on the second surface (or a line connected to the radial stub Rs) may be connected to the bias line 1500L arranged on the first surface through a via.

The antenna module 1000, employing the waveguide-slot-metal patch transfer structure, according to the present disclosure, may be formed to have at least one metal wall structure. With reference to FIGS. 2 to 3B and FIGS. 7A and 7B, the antenna module 1000 may further include the first metal wall 1110*w*. The antenna module 1000 may be configured to include at least one of the first and second metal walls 1110*w* and 1120*w*.

The first metal wall 1110*w* may be formed in a manner that is spaced a first distance D1 apart from one end portion of the first metal patch 1310 toward an upper area in the second axial direction, which is the Y-axis direction. The first metal wall 1110*w* may be formed as a via wall including a plurality of vias, but is not limited to this via wall. The first metal wall 1110*w* may vary in shape, depending on applications.

The second metal wall 1120*w* may be formed in a manner that is spaced a second distance D2 apart from the other end portion of the second metal patch 1320 toward a lower area in the second axial direction, which is the Y-axis direction. The first distance D1 and the second distance D2 may be set to be the same, and thus the first metal wall 1110*w* and the second metal wall 1120*w* may be formed in a symmetrical structure. One end portion and the other end portion of the first area 1100*a*, which is a waveguide, may be formed by the first metal wall 1110*w* and the second metal wall 1120*w*, respectively. The second metal wall 1120*w* may be formed as a via wall including a plurality of vias, but is not limited to this via wall. The second metal wall 1120*w* may vary in shape, depending on applications.

The antenna module 1000, employing the waveguide-slot-metal patch transfer structure, according to the present disclosure may be configured to operate in the first and second frequency bands according to the switching-on or off. Regarding this matter, FIGS. 8A and 8B are graphs showing return loss and insertion loss characteristics of the antenna module 1000, which vary according to the switched-on or off state of the switching element 1400.

Figure 8A:
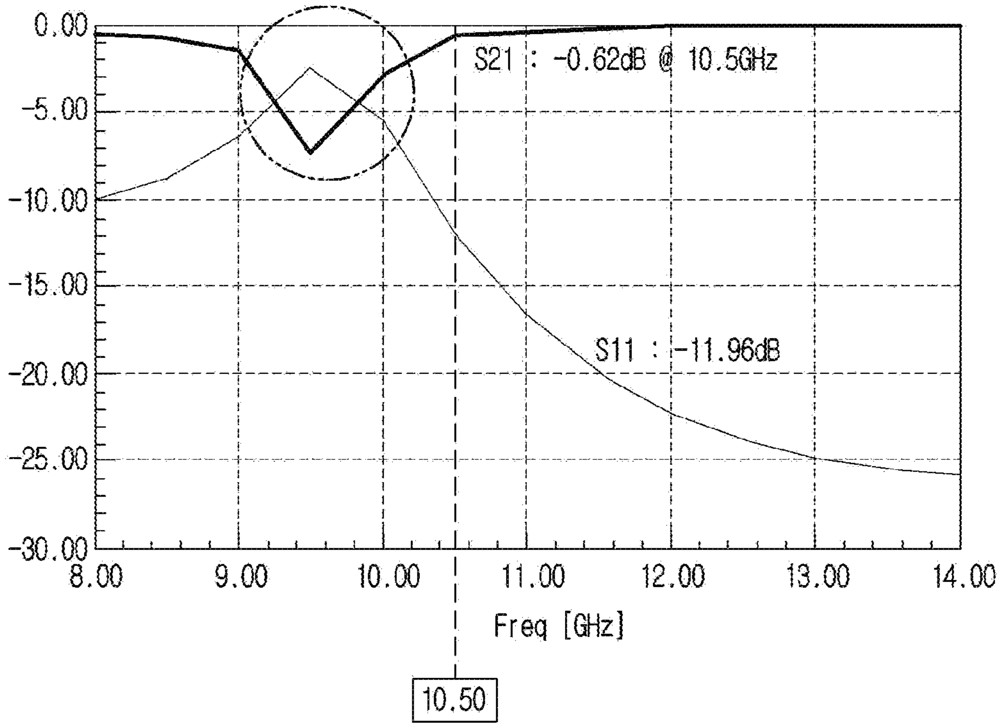
FIGS. 8A and 8B are graphs showing return loss and insertion loss characteristics of the antenna module, which vary according to a switched-on or off state of the switching element.

With reference to FIG. 8A, when the switching element 1400 is in the switched-off state, a return loss S11 of the antenna module 1000 has a value of −10 dB or less in the first frequency band. Thus, the antenna module 1000 operates as a radiator. Regarding this matter, an insertion loss S21 of the antenna module 1000 has a value equal to or higher than a predetermined value (for example, −5 dB). For example, at a frequency of 10.5 GHZ, the return loss S11 and the insertion loss S21 of the antenna module 1000 have a value of −11.96 dB and a value of −0.62 dB, respectively. Therefore, the antenna module 1000 may operate as a radiator that has an efficiency higher than a first threshold in the first frequency band.

Figure 8B:
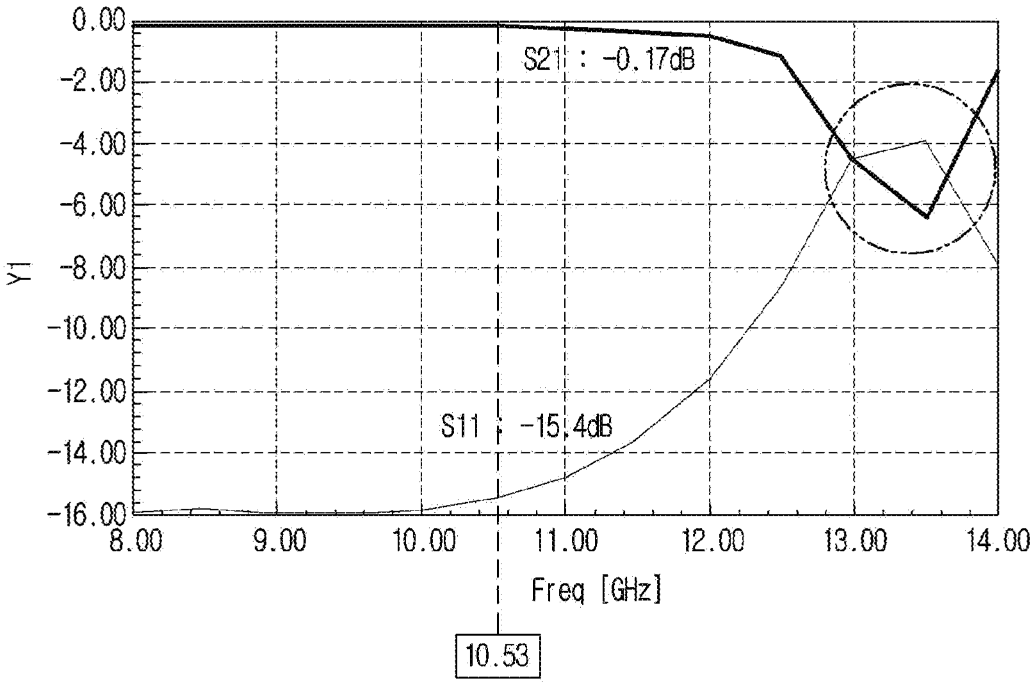

With reference to FIG. 8B, when the switching element 1400 is in the switched-on state, the return loss S11 of the antenna module 1000 has a value of −10 dB or less in the second frequency band. Thus, the antenna module 1000 operates as a radiator. Regarding this matter, the insertion loss S21 of the antenna module 1000 has a value equal to or higher than a predetermined value (for example, −5 dB). Therefore, the antenna module 1000 may operate as a radiator that has an efficiency higher than a second threshold in the second frequency band. For example, at a frequency of 10.5 GHZ, the return loss S11 and the insertion loss S21 of the antenna module have a value of −15.4 dB and a value of −0.17 dB, respectively. Accordingly, the antenna module 1000 may operate as a radiator that has an efficiency higher than the first and second thresholds in the first frequency band and the second frequency band, respectively.

Figure 9A:
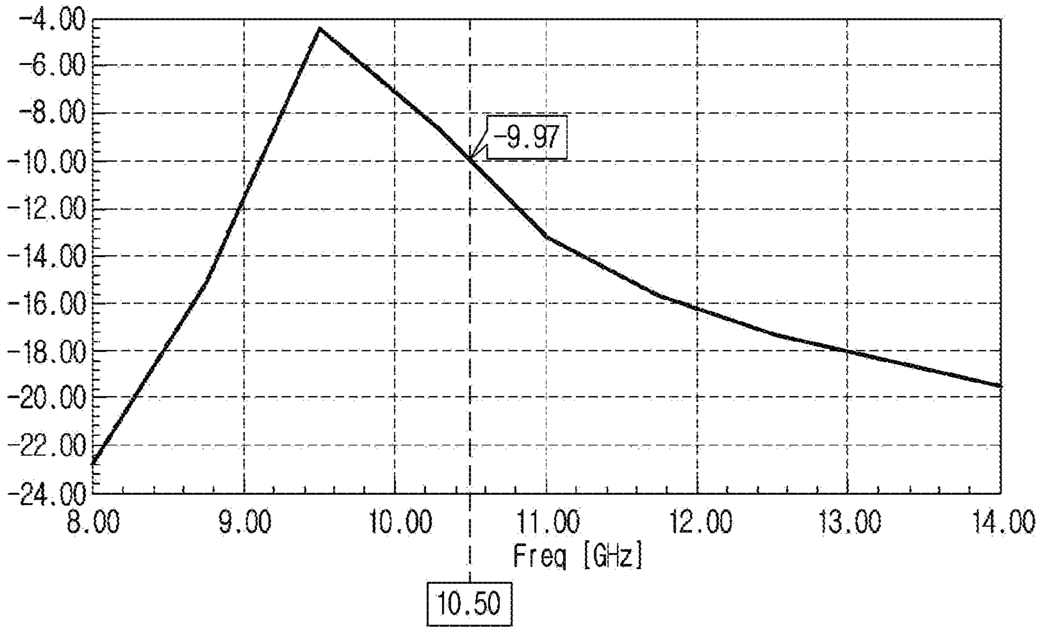
FIGS. 9A and 9B are graphs showing gain characteristics of the antenna module, which vary according to the switched-on or off state of the switching element.
Figure 9B:
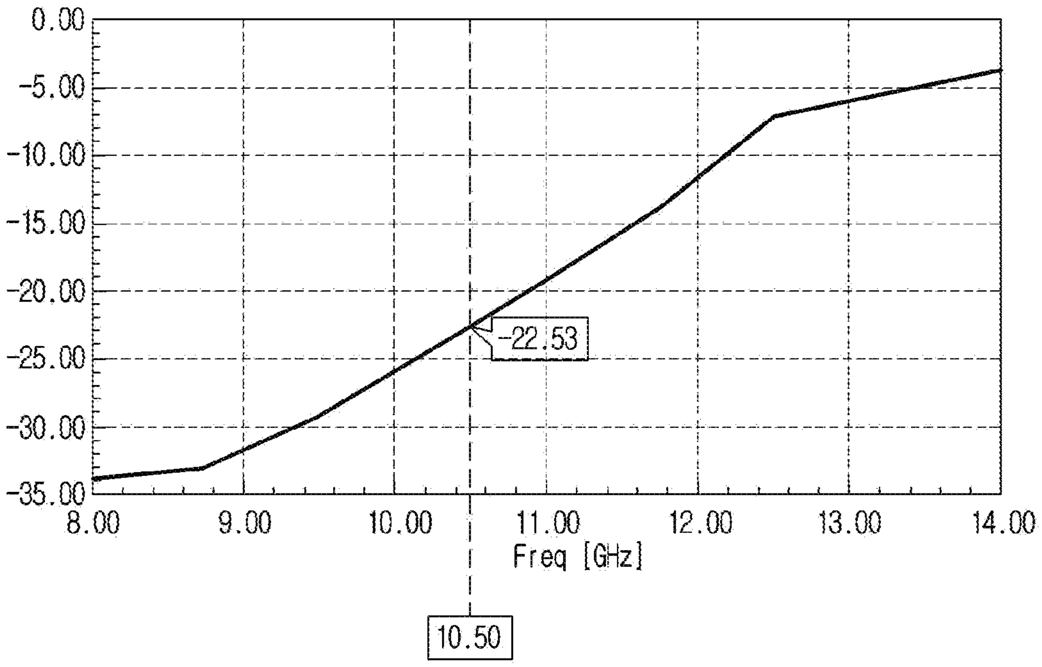

FIGS. 9A and 9B are graphs showing gain characteristics of the antenna module 100, which vary according to the switched-on or off state of the switching element 1400. With reference to FIGS. 8A and 9A, when the switching element 1400 is in the switched-off state, the antenna module 1000 may operate as a radiator in a predetermined range, using as a reference a frequency of approximately 9.5 GHZ. With reference to FIGS. 8B and 9B, when the switching element 1400 is in the switched-on state, the antenna module 1000 may operate as a radiator in a predetermined range, using as a reference a frequency of approximately 13.5 GHz.

The antenna module 1000 may operate as a radiator at different frequency bands according to the switched-on or off state of the switching element 1400. When the switching element 1400 is in a first state, the slot 1200*s* may radiate a first signal in the first frequency band. When the switching element 1400 is in a second state, the metal patch 1300 may radiate a second signal in the second frequency band broader than the first frequency band.

With reference to FIGS. 3A to 9B, the slot 1200*s* may be configured to radiate the first signal in the first frequency band when the switching element 1400 is in the switched-off state. The metal patch 1300 may be configured to form a slit and radiate the second signal in the second frequency band broader than the first frequency band when the switching element 1400 is in the switched-on state.

An operating bandwidth of the antenna module 1000, employing the waveguide-slot-metal patch transfer structure, according to the present disclosure may be defined as including the first and second frequency bands or as a bandwidth between the first and second frequency bands. Regarding this matter, FIG. 10 is a graph showing a gain of the antenna module 1000, which varies according to the switching-on or off of the switching element 1400.

Figure 10:
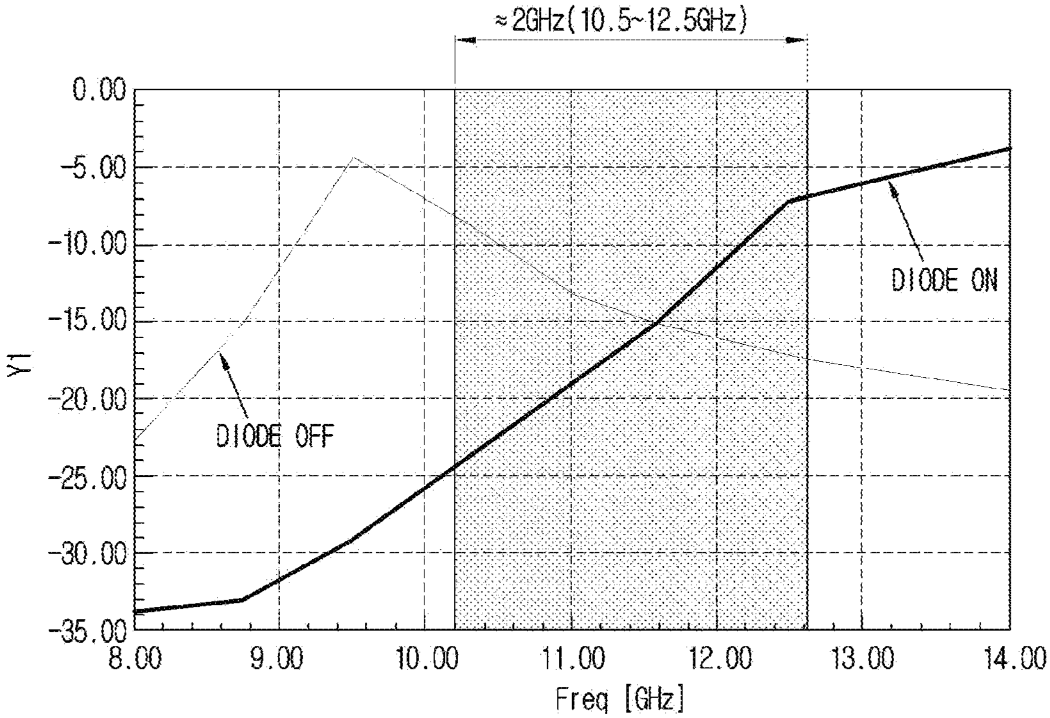
FIG. 10 is a graph showing a gain of the antenna module, which varies according to the switching-on or off of the switching element.

With reference to FIGS. 9A and 10, when the switching elements 1400 is in the switched-off state, the antenna module 1000 has a maximum gain value at a frequency of lower than 10.5 GHZ, that is, at a frequency of approximately 9.5 GHZ. With reference to FIGS. 9B and 10, when the switching elements 1400 is in the switched-on state, the antenna module 1000 has a maximum gain value at a frequency of higher than 12.5 GHZ, that is, at a frequency of approximately 14 GHZ. Therefore, an operating bandwidth of an antenna capable of performing holographic beamforming according to the present disclosure may be defined as approximately 2 GHZ, ranging from 10.5 GHz to 12.5 GHZ, taking into consideration the switching-on or off of the switching element 1400.

The antenna module 1000, employing the waveguide-slot-metal patch transfer structure, according to the present disclosure may be realized as an array antenna including a plurality of antenna elements. Through this arrange antenna structure, a directional beam may be formed, and a beamforming wireless signal may be formed by adjusting a phase of a signal applied to each of the antenna elements. In addition, beamforming may be performed on a per-frequency basis by individually controlling the switched-on or off states of the switching elements provided to the antenna elements, respectively.

Figure 11:
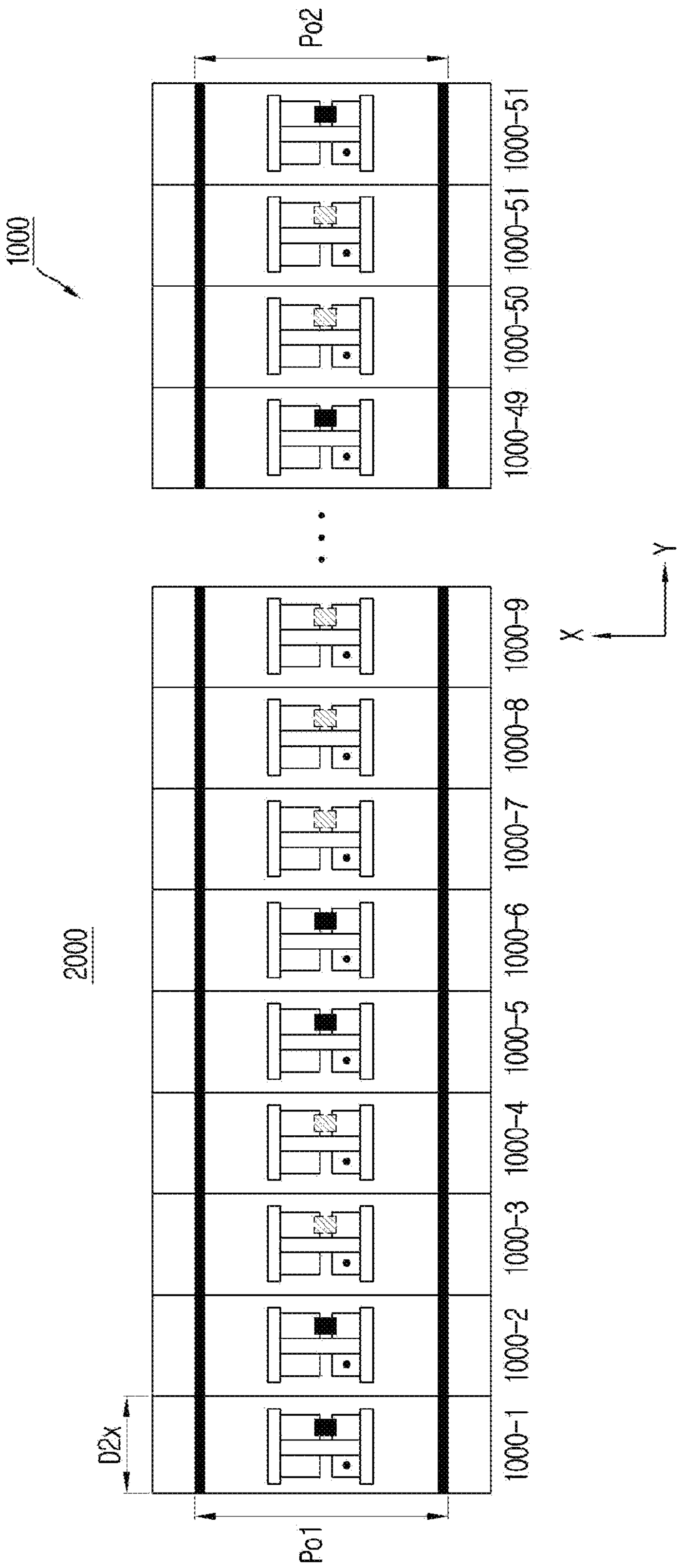
FIG. 11 is a view illustrating the antenna module that is realized as an array antenna that includes a plurality of antenna elements in a waveguide structure according to the present disclosure.
Figure 12:
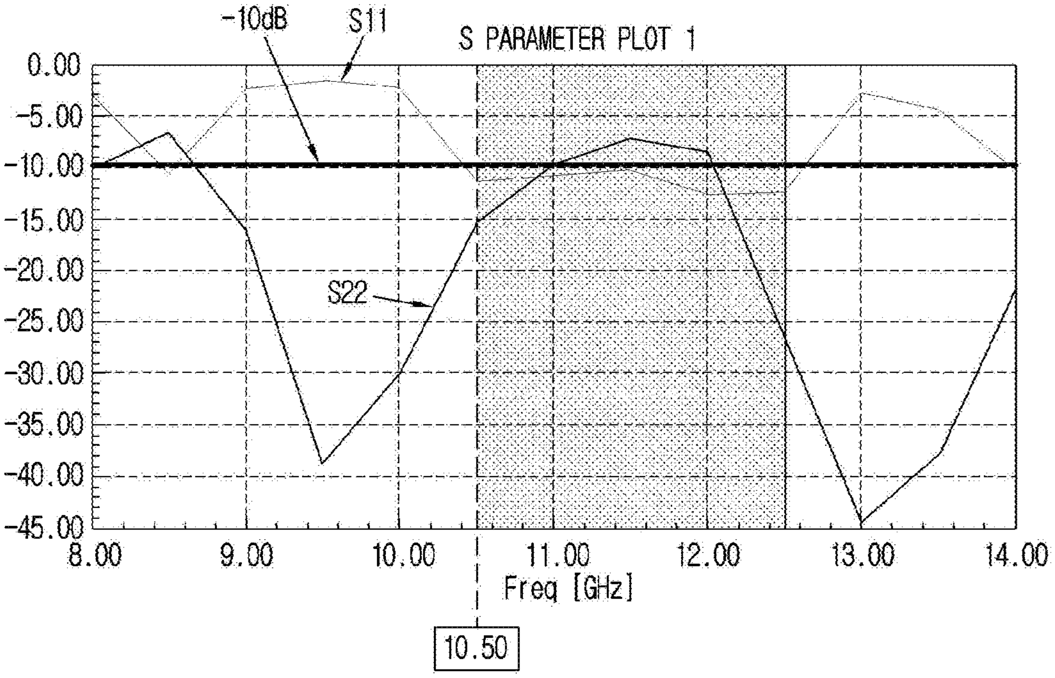
FIG. 12 shows return coefficient characteristics and an antenna gain of the antenna module that is realized as an array antenna.
Figure 12:
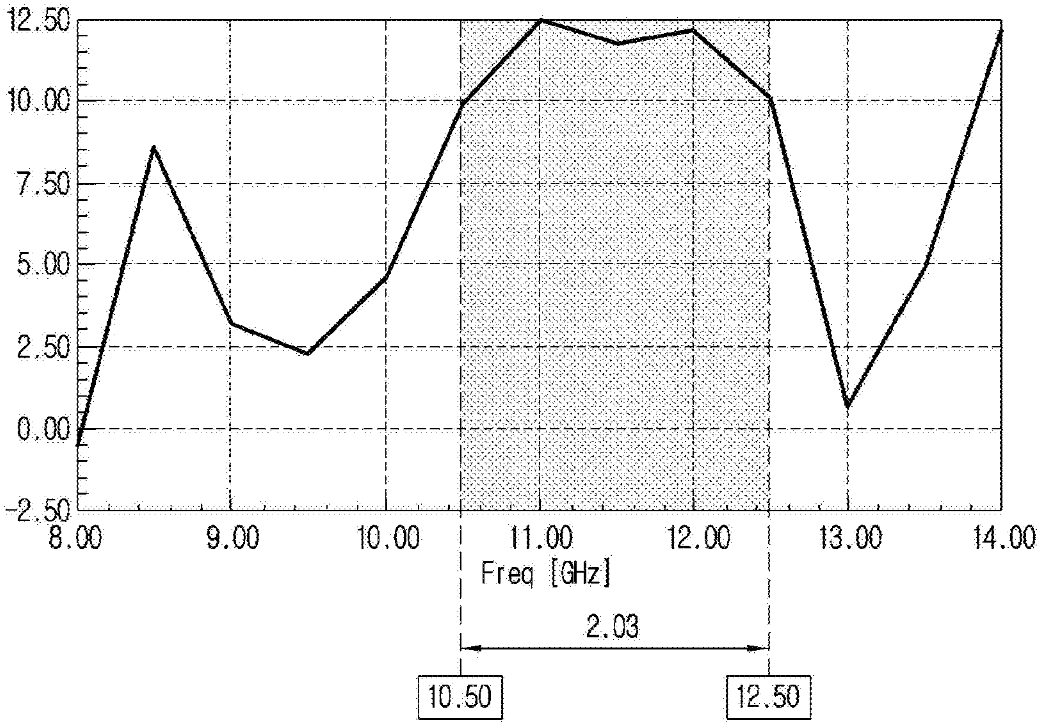

Regarding this matter, FIG. 11 is a view illustrating the antenna module 1000 that is realized as an array antenna that includes a plurality of antenna elements in a waveguide structure according to the present disclosure. FIG. 12 shows return coefficient characteristics and an antenna gain of the antenna module 1000 that is realized as an array antenna in FIG. 11.

FIG. 11 illustrates the antenna module 1000 that is realized as an array antenna 2000 including a plurality of antenna elements, that is, antenna elements 1000-1 to 1000-52. The number of the plurality of antenna elements, that is, the antenna elements 1000-1 to 1000-52 may be 52, but is not limited to 52. The number of the plurality of antenna elements may change, depending on applications.

Switching elements that are connected to one or several of the plurality of antenna elements, that is, the antenna elements 1000-1 to 1000-52, respectively, may operate in the switched-on state. The other switching elements that are connected to the others of the plurality of antenna elements, that is, the antenna elements 1000-1 to 1000-52, respectively, may operate in the switched-off state.

For example, the first, second, fifth, and sixth antenna elements 1000-1, 1000-2, 1000-5, and 1000-6 may be configured to radiate a wireless signal within the first frequency band. The third, fourth, seventh, and eighth antenna elements 1000-3, 1000-4, 1000-7, and 1000-8 may be configured to block a wireless signal within the first frequency band. Regarding this matter, switching elements that are connected to the first, second, fifth, and sixth antenna elements 1000-1, 1000-2, 1000-5, and 1000-6, respectively, may operate in the switched-off state. Switching elements that are connected to the third, fourth, seventh, and eighth antenna elements 1000-3, 1000-4, 1000-7, and 1000-8, respectively, may operate in the switched-on state. Therefore, every two switched-on or off states of the switching elements may be set to be the same in such a manner that every adjacent two antenna elements of the plurality of antenna elements, that is, the antenna elements 1000-1 to 1000-52 have the same characteristics.

The first, second, fifth, and sixth antenna elements 1000-1, 1000-2, 1000-5, and 1000-6 may be configured to block a wireless signal within the second frequency band. The third, fourth, seventh, and eighth antenna elements 1000-3, 1000-4, 1000-7, and 1000-8 may be configured to block a wireless signal within the second frequency band. Regarding this matter, switching elements that are connected to the first, second, fifth, and sixth antenna elements 1000-1, 1000-2, 1000-5, and 1000-6, respectively, may operate in the switched-on state. Switching elements that are connected to the third, fourth, seventh, and eighth antenna elements 1000-3, 1000-4, 1000-7, and 1000-8, respectively, may operate in the switched-off state. Therefore, every two switched-on or off states of the switching elements may be set to be the same in such a manner that every adjacent two antenna elements of the plurality of antenna elements, that is, the antenna elements 1000-1 to 1000-52 have the same characteristics.

As another example, every two switched-on or off states and every three switched-on or off states of the switching elements may be set to be the same in such a manner that every adjacent two antenna elements and every adjacent three antenna elements of the plurality of antenna elements, that is, the antenna elements 1000-1 to 1000-52 have the same characteristics.

For example, the first, second, fifth, and sixth antenna elements 1000-1, 1000-2, 1000-5, and 1000-6 and the 49-th and 52-nd antenna elements 1000-49 and 1000-52 may be configured to radiate a wireless signal within the first frequency band. The third, fourth, seventh, eighth, and ninth antenna elements 1000-3, 1000-4, 1000-7, 1000-8, and 1000-9 and the 50-th and 51-st antenna elements 1000-50 and 1000-51 may be configured to block a wireless signal within the first frequency band.

Regarding this matter, switching elements that are connected to the first, second, fifth, and sixth antenna elements 1000-1, 1000-2, 1000-5, and 1000-6 and the 49-th and 52-nd antenna elements 1000-49 and 1000-52, respectively, may operate in the switched-off state. Switching elements that are connected to the third, fourth, seventh, eighth, and ninth antenna elements 1000-3, 1000-4, 1000-7, 1000-8, and 1000-9 and the 50-th and 51-st antenna elements 1000-50 and 1000-51, respectively, may operate in the switched-on state.

The first, second, fifth, and sixth antenna elements 1000-1, 1000-2, 1000-5, and 1000-6 and the 49-th and 52-nd antenna elements 1000-49 and 1000-52 may be configured to block a wireless signal within the second frequency band. The third, fourth, seventh, eighth, and ninth antenna elements 1000-3, 1000-4, 1000-7, 1000-8, and 1000-9 and the 50-th and 51-st antenna elements 1000-50 and 1000-51 may be configured to radiate a wireless signal within the second frequency band. Regarding this matter, switching elements that are connected to the first, second, fifth, and sixth antenna elements 1000-1, 1000-2, 1000-5, and 1000-6 and the 49-th and 52-nd antenna elements 1000-49 and 1000-52, respectively, may operate in the switched-on state. Switching elements that are connected to the third, fourth, seventh, eighth, and ninth antenna elements 1000-3, 1000-4, 1000-7, 1000-8, and 1000-9 and the 50-th and 51-st antenna elements 1000-50 and 1000-51, respectively, may operate in the switched-off state.

FIG. 11 and FIG. 12(*a*) illustrate return coefficients S11 and S22 at a first port Po1 and a second port Po2 that are one end portion and the other end portion, respectively, of the array antenna 2000. The return coefficient S11 at the first Po1 and the return coefficient S22 at the second Po2 have a value of approximately-10 dB or less within an operating frequency band ranging from 10.5 to 12.5 GHZ.

With reference to FIGS. 11 and 12(*b*), an antenna gain of the array antenna 2000 including the plurality of antenna elements, that is, the antenna elements 1000-1 to 1000-52 has a value that is equal to or higher than a predetermined value within an operating frequency band ranging from 10.5 to 12.5 GHZ. Regarding this matter, the antenna gain of the array antenna 2000 at an operating frequency of 10.5 GHZ has a value of approximately 9.91 dB. The antenna gain of the array antenna 2000 at an operating frequency of 12.5 GHz has a value of approximately 10.1 dB. The antenna gain of the array antenna 2000 within an operating frequency band, ranging from 10.5 to 12.5 GHz has a value ranging from approximately 9.91 dB to approximately 12.5 dB.

Switching-on or-off states of switching elements that are connected to the plurality of antenna elements, that is, the antenna elements 1000-1 to 1000-52, respectively, may be set to vary from one operating frequency to another. Elements of the array antenna 2000 including the plurality of antenna elements, that is, the antenna elements 1000-1 to 1000-52, are arranged in the Y-axis direction, and a radio wave propagates in the X-axis direction. Regarding this matter, Equation 1 expresses a far-field wave as being formed by a reference wave and an interference wave of the antenna module 1000 that is realized as the array antenna 2000.

[Mathematical Equation 1]

$$\psi_{des} = \psi_{int}\psi_{ref}$$

$\psi_{des}$: Desired far field wave $\psi_{int}$: Interference wave $\psi_{ref}$: reference wave Regarding this matter, when the reference wave passes through the antenna module 100 in a guide structure, an electromagnetic wave is radiated through antenna elements positioned at different positions on an interference plane, thereby forming the far-field wave. Accordingly, as expressed in Mathematical Expression 1, a beam pattern $\Psi_{des}$ of a holographic antenna may be formed.

An amplitude modulation rule for generating a main radiation beam in a desired direction may be expressed as in Mathematical Equation 2 that follows.

[Mathematical Equation 2]

$$\psi_{int} = \frac{\cos((\beta - k\sin\theta)y) + 1}{2}$$

$$\psi_{des} = \frac{e^{-jk\sin\theta y}}{4} + \frac{e^{-j(2\beta - k\sin\theta)y}}{4} + \frac{e^{-j\beta y}}{2}$$

$$\psi_{ref} = e^{-j\beta y}$$

Therefore, in order to generate the main radiation beam at a specific angle on a per-operating frequency basis, the switched-on or-off state of each of the antenna elements may be determined as in Mathematical Equation 3, based on a value of a cosine factor in Mathematical Equation 2.

[Mathematical Equation 3]

$$\psi_{int}(y) = \text{OFF if } \cos((\beta - k\sin\theta)y) \le 0$$

$$= \text{ON if } \cos((\beta - k\sin\theta)y) > 0$$

Therefore, according to Mathematical Equation 3, the switched-on or-off state of each of the plurality of antenna elements, that is, the antenna elements 1000-1 to 1000-52, which are arranged in the Y-axis direction may be determined with the periodicity of a cosine function. Accordingly, as illustrated in FIG. 11, the first, second, fifth, and sixth antenna elements 1000-1, 1000-2, 1000-5, and 1000-6 and the 49-th and 52-nd antenna elements 1000-49 and 1000-52 may be configured to radiate a wireless signal within the first frequency band. The third, fourth, seventh, eighth, and ninth antenna elements 1000-3, 1000-4, 1000-7, 1000-8, and 1000-9 and the 50-th and 51-st antenna elements 1000-50 and 1000-51 may be configured to block a wireless signal within the first frequency band. Regarding this matter, the switching elements that are connected to the first, second, fifth, and sixth antenna elements 1000-1, 1000-2, 1000-5, and 1000-6 and the 49-th and 52-nd antenna elements 1000-49 and 1000-52, respectively, may operate in the switched-off state. The switching elements that are connected to the third, fourth, seventh, eighth, and ninth antenna elements 1000-3, 1000-4, 1000-7, 1000-8, and 1000-9 and the 50-th and 51-st antenna elements 1000-50 and 1000-51, respectively, may operate in the switched-on state.

The first, second, fifth, and sixth antenna elements 1000-1, 1000-2, 1000-5, and 1000-6 and the 49-th and 52-nd antenna elements 1000-49 and 1000-52 may be configured to block a wireless signal within the second frequency band. The third, fourth, seventh, eighth, and ninth antenna elements 1000-3, 1000-4, 1000-7, 1000-8, and 1000-9 and the 50-th and 51-st antenna elements 1000-50 and 1000-51 may be configured to radiate a wireless signal within the second frequency band. Regarding this matter, the switching elements that are connected to the first, second, fifth, and sixth antenna elements 1000-1, 1000-2, 1000-5, and 1000-6 and the 49-th and 52-nd antenna elements 1000-49 and 1000-52, respectively, may operate in the switched-on state. The switching elements that are connected to the third, fourth, seventh, eighth, and ninth antenna elements 1000-3, 1000-4, 1000-7, 1000-8, and 1000-9 and the 50-th and 51-st antenna elements 1000-50 and 1000-51, respectively, may operate in the switched-off state.

With reference to FIGS. 3A to 4B and FIG. 11, a plurality of unit cells of the antenna module 1000 may be arranged to be spaced a second distance D2× apart in the first axial direction from each other, thereby forming the array antenna 2000 including a plurality of cells. The second distance D2× may be set to one-fourth or less of a wavelength corresponding to a minimum operating frequency. Switched-on or off states of the switching elements 1400 of the plurality of cells may be controlled independently of each other.

As an operating frequency of the array antenna 2000 increases within an antenna operating bandwidth, an angle of beam spread of the array antenna 2000 may tilt from one side to the other side with respect to the horizontal direction corresponding to the first axial direction. Regarding this matter, the angle of beam spread of the array antenna 2000 may tilt from the left side to the right side with respect to the horizontal direction corresponding to the first axial direction in which the antenna elements are arranged.

Figure 13:
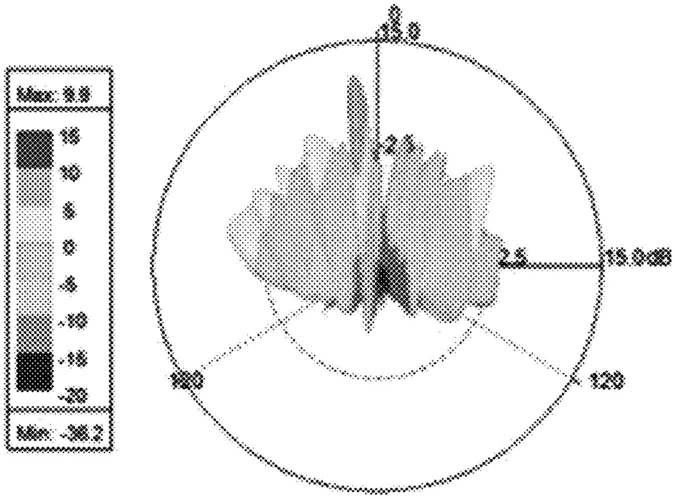
FIGS. 13 and 14 are views illustrating radiation patterns at different frequencies of the antenna module that is realized as the array antenna according to the present disclosure.
Figure 13:
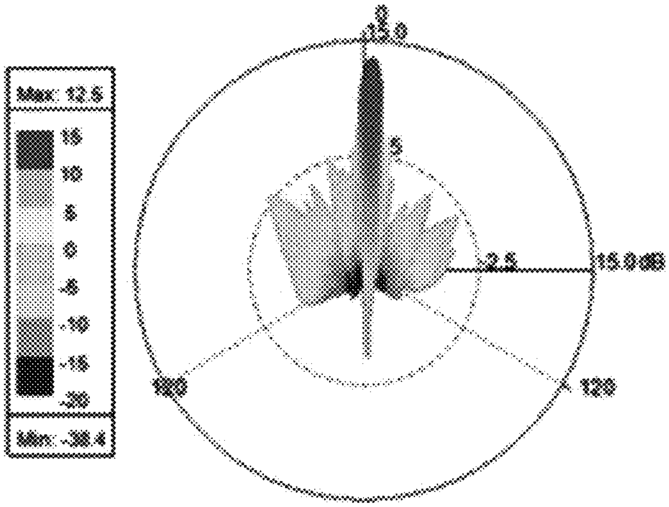
Figure 13:
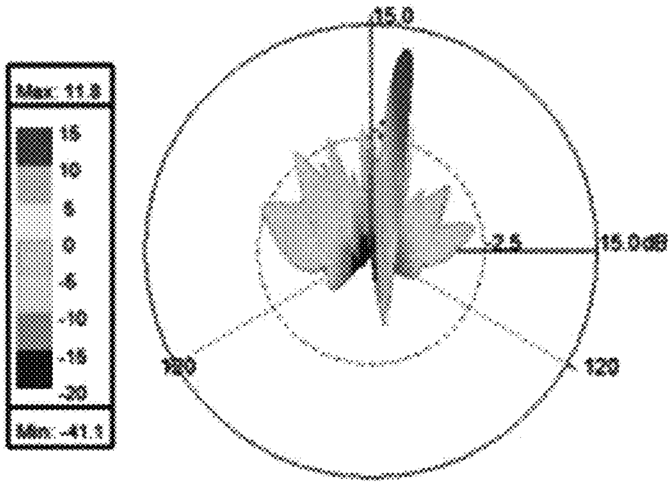
Figure 14:
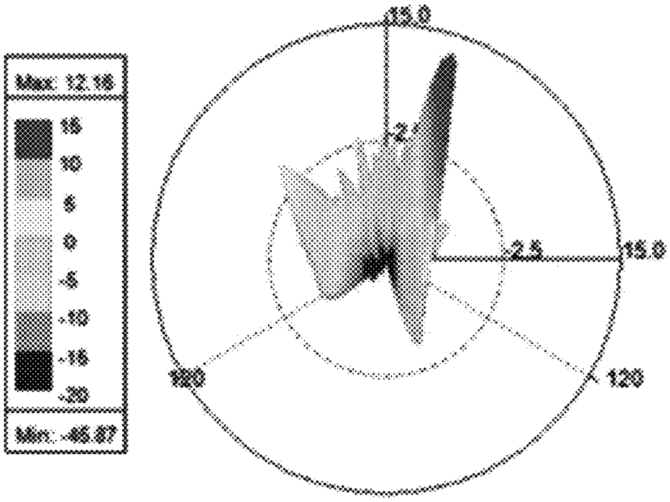
Figure 14:
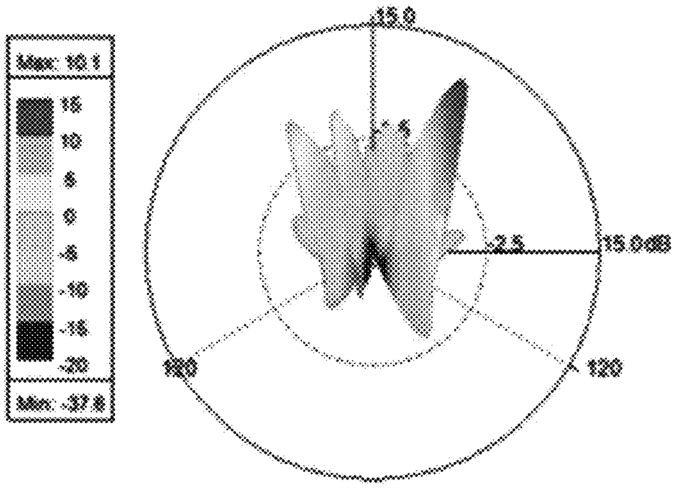

Regarding this matter, FIGS. 13 and 14 are views illustrating radiation patterns, at different frequencies, of the antenna module 1000 that is realized as the array antenna 2000 according to the present disclosure.

FIGS. 11 and 13 (*a*) illustrate a radiation pattern, at a frequency of 10.5 GHZ, of the antenna module 1000 that is realized as the array antenna 2000. The antenna module 1000 may be formed such that, at a frequency of 10.5 GHZ, a beam peak angle of the radiation pattern tilts by a first angle from the center to the leftward direction with respect to the horizontal direction. At the beam peak angle, the antenna module 1000 may have a gain value of 9.9 dB.

FIGS. 11 and 13 (*b*) illustrate a radiation pattern, at a frequency of 11 GHz, of the antenna module 1000 that is realized as the array antenna 2000. The antenna module 1000 may be formed such that, at a frequency of 11 GHZ, the beam peak angle of the radiation pattern tilts by a second angle from the center to the rightward direction with respect to the horizontal direction. Therefore, at a frequency ranging from 10.5 GHz to 11 GHz, the beam peak angle may be formed at the center with respect to the horizontal direction. The absolute value of the second angle may be set to be smaller than the absolute value of the first angle. At the beam peak angle, the antenna module 1000 may have a gain value of 12.5 dB.

FIGS. 11 and 13 (*c*) illustrate a radiation pattern, at a frequency of 11.5 GHZ, of the antenna module 1000 that is realized as the array antenna 2000. The antenna module 1000 may be formed such that, at a frequency of 11.5 GHZ, the beam peak angle of the radiation pattern tilts by a third angle, which is greater than the second angle, from the center to the rightward direction with respect to the horizontal direction. At the beam peak angle, the antenna module 1000 may have a gain value of 11.8 dB. FIGS. 11 and 14(*a*) illustrate a radiation pattern, at a frequency of 12 GHZ, of the antenna module 1000 that is realized as the array antenna 2000. The antenna module 1000 may be formed such that, at a frequency of 12 GHZ, the beam peak angle of the radiation pattern tilts by a fourth angle, which is greater than the third angle, from the center to the rightward direction with respect to the horizontal direction. At the beam peak angle, the antenna module 1000 may have a gain value of 12.16 dB.

FIGS. 11 and 14(*b*) illustrate a radiation pattern, at a frequency of 12.5 GHZ, of the antenna module 1000 that is realized as the array antenna 2000. The antenna module 1000 may be formed such that, at a frequency of 12.5 GHZ, the beam peak angle of the radiation pattern tilts by a fifth angle, which is greater than the fourth angle, from the center to the rightward direction with respect to the horizontal direction. At the beam peak angle, the antenna module 1000 may have a gain value of 10.1 dB.

Therefore, as the operating frequency increases in the antenna module 1000 that is realized as the array antenna 2000, a phenomenon where the beam pattern squints to the right side occurs. Regarding this matter, the switched-on or off (radiating or blocking) state of each of the antenna elements is determined according to Mathematical Equation 3 using as a reference an operating frequency of 11 GHz in FIG. 14(*b*).

The beam pattern may be adjusted to a desired direction and angle by changing a reference frequency for determining the switched-on or off states of the plurality of antenna elements that are realized as the array antenna 2000. Regarding this matter, the switched-on or off (radiating or blocking) state of each of the antenna elements may be determined in a manner that varies at other operating frequencies of 12 GHz and 12.5 GHZ in FIGS. 14(*a*) and 14(*b*), respectively. Therefore, as illustrated in FIG. 14(*b*), according to the switched-on or off (radiating or blocking) state determined in a manner that varies at each of the operating frequencies of 12 GHz and 12.5 GHZ, a beam direction may be formed in a manner that is adjacent to the center point in the horizontal axis direction.

In addition, the switched-on or off (radiating or blocking state) of each of the antenna elements may be determined in a manner that varies at other operating frequencies of 10.5 GHZ and 11.5 GHz in FIGS. 14(*a*) and 14(*b*). Therefore, as illustrated in FIG. 14(*b*), according to the switched-on or off (radiating or blocking) state determined in a manner that varies at each of the operating frequencies of 10.5 GHz and 11.5 GHZ, the beam direction may be formed in a manner that is adjacent to the center point in the horizontal axial direction.

The holographic antenna module according to the present disclosure is described above. The technical effects of the holographic antenna module according to the present disclosure are described as follows.

According to an embodiment of the present disclosure, a signal may be radiated or blocked on a per-operating frequency band through the switching-on or -off of the switching element of the holographic antenna module.

According to the embodiment, in 6G wireless communication systems, through the antenna module including a metasurface, the direction of a radio wave can be adjusted while reducing the switching time.

According to the embodiment of the present disclosure, a wireless beamforming signal can be transmitted or received in a desired direction over a broad band by arranging a plurality of holographic antenna elements and thus forming an array structure.

According to the embodiment of the present disclosure, without a separate phase variable element, beamforming can be performed through the metasurface including the metal patches and the switching element.

According to the embodiment, without separate electronic components, such as a phase shifter and a beamforming module, that are high-priced and high-power consuming, beamforming can be performed through the metasurface including only the metal patches and the switching element.

Further scope of applicability of the present disclosure will become apparent from the following detailed description. It should be understood, however, that the detailed description and specific examples, such as the preferred embodiments of the present disclosure, are given by way of illustration only, since various modifications and alterations within the spirit and scope of the disclosure will be apparent to those skilled in the art. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna module comprising:

a waveguide configured to have an opening area in such a manner that a signal in a specific frequency band is transferred, the waveguide including a first ground formed on a first layer and a second ground formed on a second layer over the first layer;

a slot formed in a first axial direction in the second ground;

a PCB arranged on top of the second ground;

a metal patch formed on a front surface of the PCB and overlapping the slot, the metal patch including a first metal patch and a second metal patch arranged to be spaced apart in the first axial direction from the first metal patch;

a via configured to connect a first point on any one of the first metal patch and the second metal patch and the second ground to each other; and a switching element configured to connect between a second point on the first metal patch and a third point on the second metal patch.

2. The antenna module of claim 1, wherein the first point is formed in a one-side area in a second axial direction, which is perpendicular to the first axial direction, in relation to the center point of the slot, wherein the second point and the third point are formed in the other-side area in the second axial direction in relation to the center point of the slot, wherein the second point is formed in the other-side upper area in the first axial direction and the second axial direction, and wherein the third point is formed in the other-side lower area in the first axial direction and the second axial direction.

3. The antenna module of claim 1, wherein the slot comprising:

a first slot portion formed to have a first length in a second axial direction perpendicular to the first axial direction and to have a first width in the first axial direction;

a second slot portion formed to extend from one end portion of the first slot portion in such a manner as to have a second length in the first axial direction and to have a second width in the second axial direction, and a third slot portion formed to extend from the other end portion of the first slot portion in such a manner as to have the second length in the first axial direction and to have the second width in the second axial direction.

4. The antenna module of claim 1, wherein the first metal patch is arranged in a manner that overlaps the first slot portion, and the second metal patch is arranged in a manner that overlaps the first slot portion, and wherein the first metal patch is arranged such that one end portion thereof aligns with one end portion of the first slot portion, and the second metal patch is arranged such that the other end portion thereof aligns with the other end portion of the first portion.

5. The antenna module of claim 1, further comprising:

a bias controller controlling the switching element in a manner that enters a switched-on or -off state, by applying electric power to the switching element, wherein the bias controller is connected to any one of the first metal patch and the second metal patch through a bias line.

6. The antenna module of claim 5, wherein the bias controller is arranged on the front surface of the PCB, and wherein the bias line arranged on the front surface of the PCB is connected to any one of the first metal patch and the second metal patch.

7. The antenna module of claim 5, wherein the bias controller is arranged on the first layer of the waveguide on which the first ground is formed, and wherein the bias controller arranged on the first layer of the waveguide is connected to the bias line arranged on the front surface of the PCB through a first vertical via.

8. The antenna module of claim 5, further comprising:

a second PCB arranged underneath the first ground of the waveguide, wherein a third ground arranged on a rear surface of the second PCB is connected to the first ground of the waveguide through ground vias, wherein the bias controller is arranged on the rear surface of the second PCB, and wherein the bias controller arranged on the rear surface of the second PCB is connected to the bias line arranged on the front surface of the PCB through a second vertical via.

9. The antenna module of claim 5, wherein the bias line is connected to any one of the first metal patch and the second metal patch through an RF choke configured to block an RF signal in first and second frequency bands, and wherein the bias line is realized as have a linewidth that is equal to or smaller than 200 um.

10. The antenna module of claim 5, wherein the bias line is connected to any one of the first metal patch and the second metal patch through a radial stub configured to block an RF signal in first and second frequency bands, wherein the radial stub is formed to have a first radius and a first angle range and blocks the RF signal, and wherein the radial stub is formed on a second surface facing a radiation surface on which the metal patch is arranged.

11. The antenna module of claim 1, further comprising:

a first wall formed in a manner that is spaced a first distance apart from one end portion of the first metal patch toward an upper area in a second axial direction; and a second wall formed in a manner that is spaced the first distance apart from the other end portion of the second metal patch toward a lower area in the second axial direction.

12. The antenna module of claim 1, wherein when the switching element is in a switched-on state, the slot radiates a first signal in a first frequency band, and wherein when the switching element is in a switched-on state, the metal patch radiates a second signal in a second frequency band that is broader than the first frequency band.

13. The antenna module of claim 3, wherein the first slot portion is formed such that the first length thereof is greater than the second length of each of the second slot portion and the third slot portion, wherein the first slot portion is formed such that the first length thereof is greater than a third length, in the second axial direction, of the metal patch, wherein the metal patch is formed such that a first width, in the first axial direction, thereof is equal to or smaller than the second length of each of the second slot portion and the third slot portion, and wherein the first length, the second length, the third length, and the first width are set to one-fourth or less of a wavelength corresponding to a minimum operating frequency.

14. The antenna module of claim 1, wherein a plurality of unit cells of the antenna module are arranged to be spaced a second distance apart in the first axial direction from each other, thereby forming an array antenna including a plurality of cells, and wherein the second distance is set to one-fourth or less of a wavelength corresponding to a minimum operating frequency.

15. The antenna module of claim 14, wherein switched-on or -off states of switching elements of the plurality of cells are controlled independently of each other, and wherein as an operating frequency of the array antenna increases, an angle of beam spread tilts from one side to the other side with respect to a horizontal direction corresponding to the first axial direction.

* * * * *